(12) United States Patent
Shin et al.

(10) Patent No.: US 11,499,017 B2
(45) Date of Patent: Nov. 15, 2022

(54) AQUEOUS DISPERSION OF ETHYLENE-CARBOXYLIC ACID COPOLYMER AND METHOD OF PREPARING THE SAME

(71) Applicants: SK Innovation Co., Ltd., Seoul (KR); SK Global Chemical Co., Ltd., Seoul (KR); SK GC Americas Inc., Houston, TX (US)

(72) Inventors: Hai Jin Shin, Daejeon (KR); Doh Yeon Park, Daejeon (KR); Yong Zheng, Houston, TX (US); Hae Woong Park, Daejeon (KR)

(73) Assignees: SK Innovation Co., Ltd., Seoul (KR); SK Global Chemical Co., Ltd., Seoul (KR); SK GC Americas Inc., Houston, TX (US)

( * ) Notice: Subject to any disclaimer, the term of this patent is extended or adjusted under 35 U.S.C. 154(b) by 11 days.

(21) Appl. No.: 17/064,170

(22) Filed: Oct. 6, 2020

(65) Prior Publication Data
US 2021/0102030 A1    Apr. 8, 2021

Related U.S. Application Data

(60) Provisional application No. 62/911,424, filed on Oct. 7, 2019.

(30) Foreign Application Priority Data

Nov. 11, 2019   (KR) .................. 10-2019-0143773

(51) Int. Cl.
   *C08J 3/05*   (2006.01)
   *C08L 23/08*  (2006.01)
   (Continued)

(52) U.S. Cl.
   CPC .............. *C08J 3/05* (2013.01); *B32B 15/082* (2013.01); *B32B 15/20* (2013.01); *B32B 27/08* (2013.01);
   (Continued)

(58) Field of Classification Search
   CPC ... C08L 23/0869; C08L 23/0876; C08K 3/16; C08K 3/26; C08K 2003/162;
   (Continued)

(56) References Cited

U.S. PATENT DOCUMENTS

| 4,933,091 A | 6/1990 | Geke et al. |
| 6,852,792 B1 | 2/2005 | Capendale et al. |

(Continued)

FOREIGN PATENT DOCUMENTS

| JP | 54061249 A | * | 5/1979 |
| JP | S5461249 A | | 5/1979 |

(Continued)

OTHER PUBLICATIONS

English-language abstract of JP-54061249-A.*
Computer-generated English-language translation of JP-54061249-A.*

*Primary Examiner* — Vu A Nguyen
(74) *Attorney, Agent, or Firm* — The Webb Law Firm

(57) ABSTRACT

A method of preparing an aqueous dispersion of an ethylene-carboxylic acid copolymer according to exemplary embodiments of the present invention includes: mixing 30% by weight or more of an ethylene-(meth)acrylic acid copolymer, a basic compound, and water to form a mixed solution; and adding an inorganic salt compound to the mixed solution. Therefore, the aqueous dispersion of the ethylene-carboxylic acid copolymer may be effectively dispersed.

12 Claims, 3 Drawing Sheets

(51) Int. Cl.

| | |
|---|---|
| *C08L 33/02* | (2006.01) |
| *C08K 3/16* | (2006.01) |
| *C08K 3/30* | (2006.01) |
| *B32B 15/082* | (2006.01) |
| *B32B 15/20* | (2006.01) |
| *B32B 27/08* | (2006.01) |
| *B32B 27/30* | (2006.01) |
| *C08J 5/18* | (2006.01) |

(52) U.S. Cl.
CPC ............... *B32B 27/308* (2013.01); *C08J 5/18* (2013.01); *C08L 23/0869* (2013.01); *B32B 2255/10* (2013.01); *B32B 2255/26* (2013.01); *B32B 2311/24* (2013.01); *C08J 2323/08* (2013.01)

(58) Field of Classification Search
CPC ...... C08K 2003/262; C08K 2003/3045; C08K 2003/324
See application file for complete search history.

(56) References Cited

U.S. PATENT DOCUMENTS

| | | |
|---|---|---|
| 2011/0319540 A1 | 12/2011 | Ito et al. |
| 2016/0145806 A1 | 5/2016 | Rhee |

FOREIGN PATENT DOCUMENTS

| | | |
|---|---|---|
| JP | H6872 B2 | 1/1994 |
| JP | 2747318 B2 | 5/1998 |
| KR | 1020140115234 A | 9/2014 |

\* cited by examiner

[FIG. 1]
```
MIX ETHYLENE-(METH)ACRYLIC ACID
COPOLYMER AND BASIC COMPOUND TO      ~ S10
FORM MIXED SOLUTION
              |
              v
ADD INORGANIC SALT COMPOUND TO        ~ S20
MIXED SOLUTION
```
[FIG. 2]
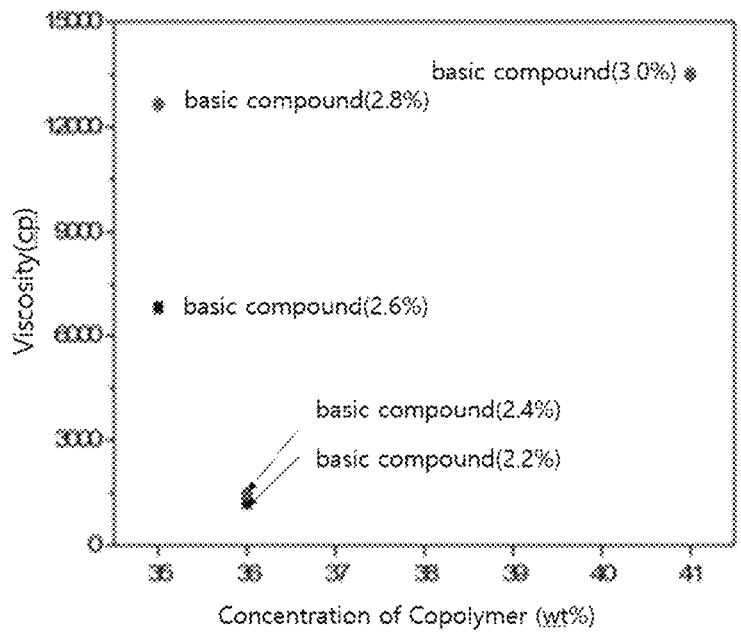
[FIG. 3]
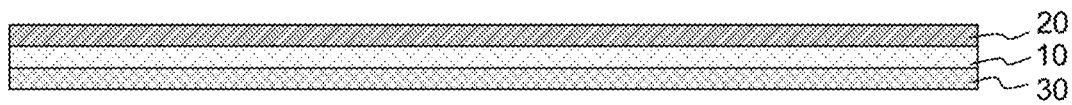

[FIG. 4]
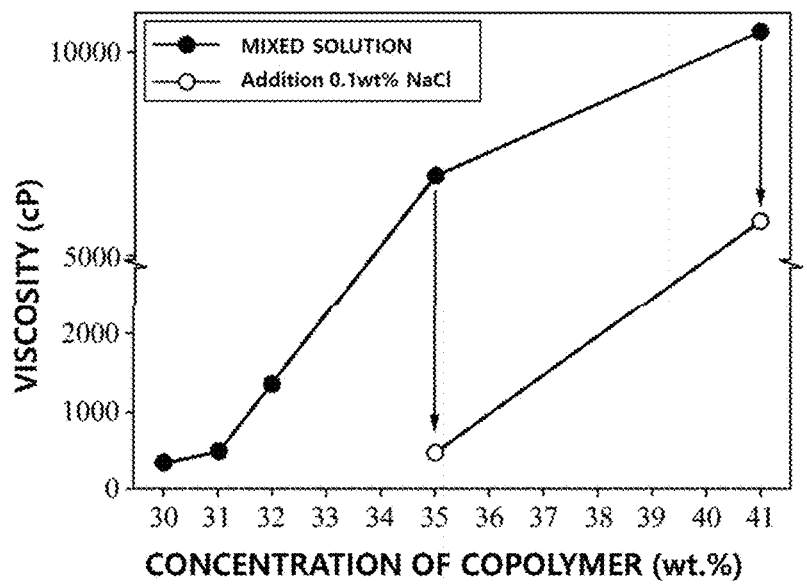
[FIG. 5]
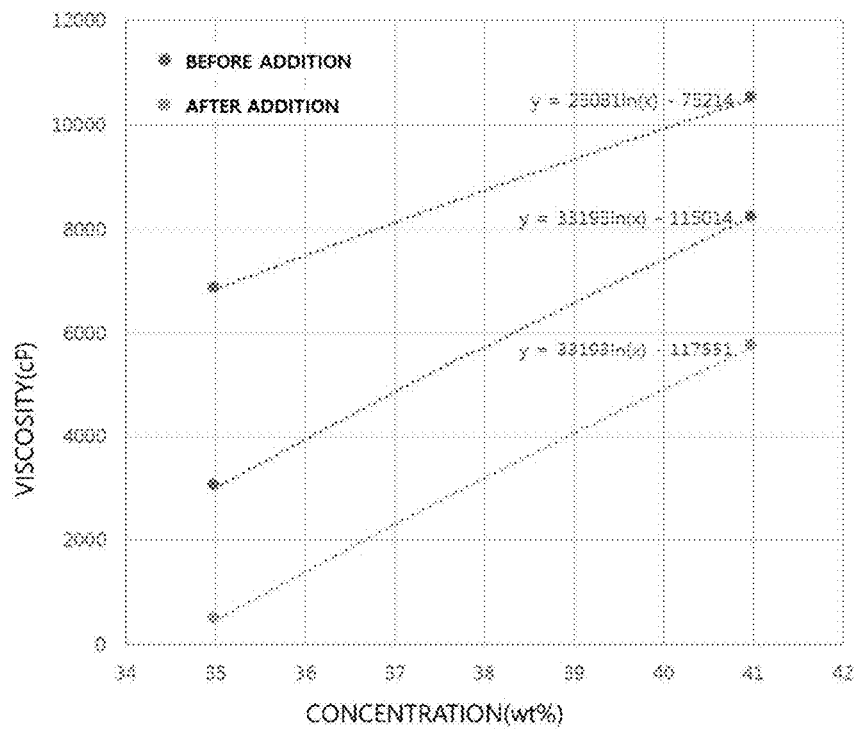

[FIG. 6]
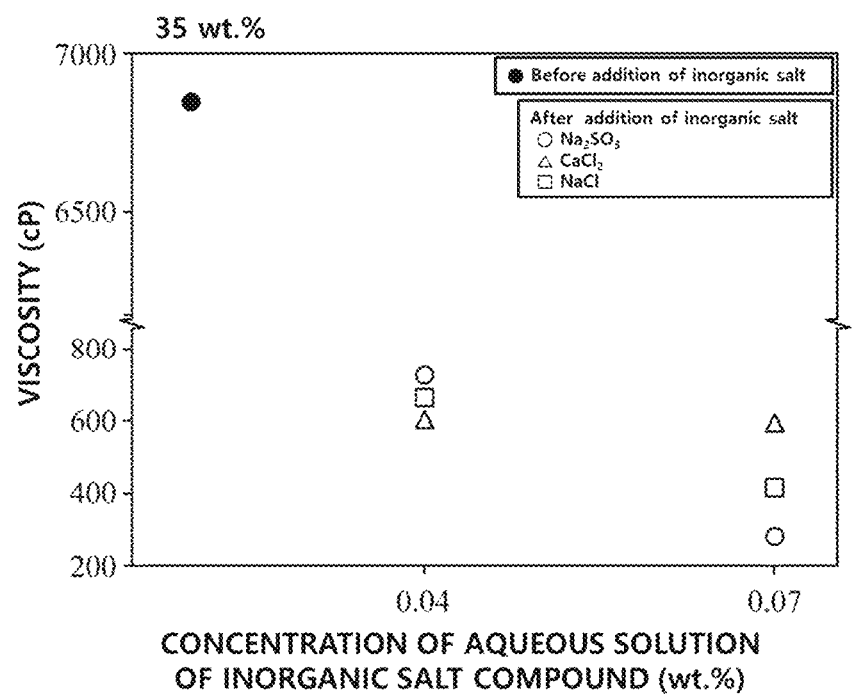

AQUEOUS DISPERSION OF ETHYLENE-CARBOXYLIC ACID COPOLYMER AND METHOD OF PREPARING THE SAME

CROSS-REFERENCE TO RELATED APPLICATIONS

This application claims priority to U.S. Provisional Patent Application No. 62/911,424 filed Oct. 7, 2019 and Korean Patent Application No. 10-2019-0143773 filed Nov. 11, 2019, the disclosures of which are hereby incorporated by reference in their entirety.

BACKGROUND OF THE INVENTION

1. Field of the Invention

The present invention relates to an aqueous dispersion of an ethylene-carboxylic acid copolymer and a method of preparing the same, and more specifically, to an aqueous dispersion including an ethylene-carboxylic acid copolymer and inorganic additives, and a method of preparing the same.

2. Description of the Related Art

Carboxylic acid copolymers such as an ethylene-carboxylic acid copolymer are used in various applications such as a coating material, sealing material, adhesive, packing material, optical film and the like. The ethylene-carboxylic acid copolymer may be prepared by polymerizing ethylene, and acrylic acid or methacrylic acid as a comonomer through a continuous reactor.

The ethylene-carboxylic acid copolymer may be dispersed in water and used as a coating agent, sealing agent, adhesive and the like. Applying the dispersion to a target material, and then evaporating moisture, it is possible to perform coating, sealing, bonding, and the like thereon.

When drying the dispersion, the smaller a content of water (the higher a concentration of the ethylene-carboxylic acid copolymer), the less water is evaporated, such that coating, sealing, bonding, and the like may be efficiently performed. In addition, the smaller the content of water in the dispersion, the more advantageous in terms of transportation costs based on the same amount of the ethylene-carboxylic acid copolymer.

However, as the concentration of the ethylene-carboxylic acid copolymer is increased, a viscosity of the dispersion is increased, and gelation may occur. In this case, coating properties of the dispersion are remarkably deteriorated, such that the dispersion cannot be applied as the coating agent, sealing agent, adhesive and the like.

For example, U.S. Pat. No. 6,852,792 discloses an aqueous dispersion for sealing, which includes an ethylene-carboxylic acid copolymer, but the development for an aqueous dispersion, in which gelation is suppressed while having a low viscosity and the ethylene-carboxylic acid copolymer is included in a high content, is still required.

PRIOR ART DOCUMENT

Patent Document

U.S. Pat. No. 6,852,792

SUMMARY OF THE INVENTION

An object of the present invention is to provide an aqueous dispersion of an ethylene-carboxylic acid copolymer, which has excellent dispersibility.

Another object of the present invention is to provide a method of preparing an aqueous dispersion of an ethylene-carboxylic acid copolymer, which has excellent dispersibility.

In order to achieve the above objects, according to exemplary embodiments of the present invention, there is provided a method of preparing an aqueous dispersion of an ethylene-carboxylic acid copolymer, including: mixing 30% by weight or more of an ethylene-(meth)acrylic acid copolymer, a basic compound, and water to form a mixed solution; and adding an inorganic salt compound to the mixed solution.

In exemplary embodiments, the step of forming the mixed solution may include stirring the mixture at a temperature of 80° C. or higher.

In exemplary embodiments, the step of adding the inorganic salt compound may include adding an aqueous solution of the inorganic salt compound.

In exemplary embodiments, the step of adding the inorganic salt compound may include stirring the mixture at a temperature of 60 to 80° C.

In exemplary embodiments, the inorganic salt compound may be added in an amount of 0.01 to 0.3% by weight based on a total weight of the aqueous dispersion.

In exemplary embodiments, the inorganic salt compound may include at least one selected from the group consisting of sodium chloride (NaCl), calcium chloride ($CaCl_2$), sodium sulfite ($Na_2SO_3$), sodium sulfate ($Na_2SO_4$), sodium carbonate ($Na_2CO_3$), potassium chloride (KCl), trisodium phosphate ($Na_3PO_4$) and ammonium chloride ($NH_4Cl$).

In exemplary embodiments, the ethylene-(meth)acrylic acid copolymer may include 70 to 85% by weight of ethylene-derived unit and 15 to 30% by weight of (meth)acrylic acid-derived unit.

In exemplary embodiments, the ethylene-(meth)acrylic acid copolymer may have a weight average molecular weight (Mw) of 10,000 to 60,000.

In exemplary embodiments, the basic compound may be mixed in an amount of 1 to 12% by weight based on the total weight of the mixed solution.

In exemplary embodiments, a viscosity of the mixed solution before adding the inorganic salt compound may be 6,000 cPs or more, and the viscosity of the aqueous dispersion solution with the inorganic salt compound added thereto may be 5,000 cPs or less.

In exemplary embodiments, the aqueous dispersion including the ethylene-(meth)acrylic acid copolymer and the inorganic salt may have a viscosity of 60% or less based on the viscosity of the mixed solution including the ethylene-(meth)acrylic acid copolymer.

In addition, according to another aspect of the present invention, there is provided an aqueous dispersion of an ethylene-carboxylic acid copolymer including 30% by weight or more of an ethylene-(meth)acrylic acid copolymer, a basic compound, an inorganic salt compound, and water as the balance.

In exemplary embodiments, the inorganic salt compound may be included in an amount of 0.01 to 0.3% by weight based on the total weight of the aqueous dispersion.

In exemplary embodiments, the inorganic salt compound may include at least one selected from the group consisting of sodium chloride (NaCl), calcium chloride ($CaCl_2$), sodium sulfite ($Na_2SO_3$), sodium sulfate ($Na_2SO_4$), sodium carbonate ($Na_2CO_3$), potassium chloride (KCl), trisodium phosphate ($Na_3PO_4$) and ammonium chloride ($NH_4Cl$).

In exemplary embodiments, the ethylene-(meth)acrylic acid copolymer may include 70 to 85% by weight of ethylene-derived unit and 15 to 30% by weight of (meth) acrylic acid-derived unit.

In exemplary embodiments, the basic compound may be included in an amount of 1 to 12% by weight based on the total weight of the aqueous dispersion.

Further, according to another aspect of the present invention, there is provided a coating film including 30% by weight or more of an ethylene-(meth)acrylic acid copolymer, a basic compound, and an inorganic salt compound.

Furthermore, according to another aspect of the present invention, there is provided a multilayer film including the above coating film.

In exemplary embodiments, the multilayer film may include the coating film, a polyolefin layer adhered to one surface of the coating film, and an aluminum layer adhered to the other surface of the coating film.

According to exemplary embodiments of the present invention, by adding an inorganic salt compound to the aqueous dispersion of the ethylene-(meth)acrylic acid copolymer, the ethylene-(meth)acrylic acid copolymer may be effectively dispersed in the aqueous dispersion. Therefore, by easily adjusting the viscosity of the aqueous dispersion, it is possible to provide an aqueous dispersion of an ethylene-(meth)acrylic acid copolymer having a high concentration and a low viscosity.

Accordingly, coating properties of the aqueous dispersion may be improved, and gelation may be suppressed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic flowchart illustrating a method of preparing an aqueous dispersion of an ethylene-carboxylic acid copolymer according to exemplary embodiments of the present invention;

FIG. 2 is a graph illustrating a viscosity of an aqueous dispersion according to exemplary embodiments of the present invention, according to a concentration of a copolymer and a concentration of a basic compound.

FIG. 3 is a schematic cross-sectional view illustrating a coating film and a multilayer film including the same according to exemplary embodiments of the present invention;

FIG. 4 is a graph illustrating a change in viscosity of an aqueous dispersion according to exemplary embodiments of the present invention, when adding an inorganic salt compound thereto;

FIG. 5 is a graph illustrating a change in the viscosity of the aqueous dispersion in a range of 35 to 41% by weight ('wt. %') of the copolymer concentration depending on an addition of the inorganic salt compound; and FIG. 6 is a graph illustrating a relationship between a type and concentration of the inorganic salt compound and the viscosity of the aqueous dispersion in the aqueous dispersion according to exemplary embodiments.

DETAILED DESCRIPTION OF THE INVENTION

Exemplary embodiments of the present invention provide a method of preparing an aqueous dispersion of an ethylene-carboxylic acid copolymer, including: mixing 30 wt. % or more of an ethylene-(meth)acrylic acid copolymer, a basic compound, and water to form a mixed solution; and adding an inorganic salt compound to the mixed solution. Therefore, the aqueous dispersion of the ethylene-carboxylic acid copolymer having a high concentration and a low viscosity may be easily prepared.

In addition, exemplary embodiments of the present invention provide an aqueous dispersion of an ethylene-carboxylic acid copolymer.

The term "(meth)acrylic acid" as used herein encompasses acrylic acid and methacrylic acid.

FIG. 1 is a schematic flowchart illustrating a method of preparing an aqueous dispersion of an ethylene-carboxylic acid copolymer according to exemplary embodiments of the present invention.

According to exemplary embodiments, by mixing an ethylene-(meth)acrylic acid copolymer, a basic compound and water, a mixed solution may be prepared (for example, step S10).

The ethylene-(meth)acrylic acid copolymer may be mixed in an amount of 30 wt. % or more based on a total weight of the mixed solution. Accordingly, the aqueous dispersion prepared according to exemplary embodiments of the present invention may include the ethylene-(meth)acrylic acid copolymer at a high concentration. Preferably, the ethylene-(meth)acrylic acid copolymer is mixed in an amount of 40 wt. % or more, and more preferably, 42 wt. % or 45 wt. % or more.

In exemplary embodiments, the ethylene-(meth)acrylic acid copolymer may be mixed in an amount of 49 wt. % or less based on the total weight of the mixed solution. When exceeding the above amount, gelation of the ethylene-(meth) acrylic acid copolymer is accelerated, such that it may be substantially difficult to adjust the viscosity of the aqueous dispersion of the ethylene-carboxylic acid copolymer to a range suitable for use as a coating agent.

In exemplary embodiments, the ethylene-(meth)acrylic acid copolymer may have a weight average molecular weight (Mw) of 10,000 to 60,000. Preferably, the weight average molecular weight thereof is 10,000 to 40,000, and more preferably, 20,000 to 40,000.

For example, the ethylene-(meth)acrylic acid copolymer may have a weight average molecular weight of 15,000 to 25,000 (a first copolymer). By adding an inorganic salt compound to the aqueous dispersion of the first copolymer, the viscosity of the aqueous dispersion may be effectively reduced.

In addition, the ethylene-(meth)acrylic acid copolymer may have a weight average molecular weight of 25,000 to 35,000 (a second copolymer). In the case of the second copolymer, a degree of increase in the viscosity may be greater even at the same copolymer concentration. Therefore, in general, when the concentration of the second copolymer exceeds 30% in the aqueous dispersion, the concentration thereof may be excessively increased. However, as described below, the viscosity of the aqueous dispersion of the high molecular weight copolymer may be effectively controlled by adding the inorganic salt compound.

In some embodiments, the ethylene-(meth)acrylic acid copolymer may have a polydispersity index of 2 to 5, and preferably 2.5 to 4.

In exemplary embodiments, the ethylene-(meth)acrylic acid copolymer may include 70 to 85 wt. % of ethylene-derived unit and to 30 wt. % of (meth)acrylic acid-derived unit. When the (meth)acrylic acid-derived unit is less than 15 wt. %, the ethylene (meth)acrylic acid copolymer may not be dispersed in an aqueous solution. Preferably, the ethylene-derived unit is included in an amount of 75 to 80 wt. %, and the (meth)acrylic acid-derived unit is included in an amount of 20 to 25 wt. %.

In some embodiments, the ethylene-(meth)acrylic acid copolymer may have a melting point (Tm) of 50 to 100° C. Therefore, the aqueous dispersion may be applied as a coating agent, sealing agent, adhesive, and the like at a low temperature. Preferably, the melting point thereof is 60 to 95° C., and more preferably, 70 to 80° C.

The ethylene-(meth)acrylic acid copolymer may exhibit acidity due to a carboxyl group of (meth)acrylic acid-derived unit. The basic compound may neutralize the carboxyl group of the (meth)acrylic acid-derived unit.

In exemplary embodiments, the basic compound may include at least one selected from the group consisting of ammonium hydroxide ($NH_4OH$), lithium hydroxide (LiOH), sodium hydroxide (NaOH), potassium hydroxide (KOH), cesium hydroxide (CsOH), and an organic amine compound.

The basic compound may perform an acid-base neutralization reaction with a carboxyl group of the (meth)acrylic acid-derived unit of the ethylene-(meth)acrylic acid copolymer. In this case, a dispersibility of the ethylene-(meth) acrylic acid copolymer in water may be increased. In exemplary embodiments, the basic compound may be included in an amount of 1 to 12 wt. % based on the total weight of the mixed solution. When the content of the basic compound is less than 1 wt. %, the neutralization reaction for the carboxyl group of the (meth)acrylic acid-derived unit may be insufficiently performed. Accordingly, the dispersibility of the ethylene-(meth)acrylic acid copolymer in water may be reduced. When the content of the basic compound exceeds 12 wt. %, the ethylene-(meth)acrylic acid copolymer may be excessively neutralized to cause an increase in the viscosity of the aqueous dispersion. Preferably, the basic compound is included in an amount of 2 to 6 wt. % based on the total weight of the mixed solution.

Water may be provided as a solvent and/or dispersing solvent of the ethylene-(meth)acrylic acid copolymer and the basic compound. In some embodiments, the water may include pure water or deionized water.

In exemplary embodiments, the water may be included as the balance to the sum of contents of the ethylene-(meth) acrylic acid copolymer and the basic compound in the mixed solution. In one embodiment, the mixed solution may not include a component other than the ethylene-carboxylic acid copolymer, the basic compound, and water as the balance.

In exemplary embodiments, the step of forming the mixed solution (S10) may be performed by stirring the mixture at a temperature of 80° C. or higher. In this case, the neutralization reaction between the ethylene-(meth)acrylic acid copolymer and the basic compound may be accelerated, and the ethylene-(meth)acrylic acid copolymer, which is at least partially neutralized, and the unreacted ethylene-(meth) acrylic acid copolymer may be effectively dissolved in water. Preferably, the mixing is performed at a temperature of 90° C. or higher.

In exemplary embodiments, the mixed solution may have a viscosity of 6,000 cPs or more. The viscosity thereof may be a viscosity at room temperature (25°). In this case, the aqueous dispersion may exhibit insufficient coating properties at room temperature.

In exemplary embodiments, an inorganic salt compound may be added to the mixed solution (for example, step S20).

The inorganic salt compound may be dissolved in the mixed solution to increase an ion concentration in the mixed solution. The ethylene-(meth)acrylic acid copolymer, which is at least partially ionized by the neutralization reaction, is effectively dispersed in the mixed solution by repulsive and repelling forces between the ions, such that the viscosity of the aqueous dispersion may be effectively reduced.

For example, to prepare the mixed solution (for example, step S10), when mixing the ethylene-(meth)acrylic acid copolymer, and the basic compound with the inorganic salt compound together with water, the inorganic salt compound dissociated in water may not contribute to an effect of reducing the viscosity of the aqueous dispersion.

In exemplary embodiments, the inorganic salt compound may be added in an amount of 0.01 to 0.3 wt. % based on the total weight of the aqueous dispersion. When the content of the inorganic salt compound is less than 0.01 wt. %, the effect of reducing the viscosity of the aqueous dispersion of the ethylene-(meth)acrylic acid copolymer may be insufficient. When the content of the inorganic salt compound exceeds 0.3 wt. %, a precipitate may be formed in the aqueous dispersion of the ethylene-carboxylic acid copolymer by the inorganic salt compound. Preferably, the content of the inorganic salt compound is 0.04, 0.07 or 0.1 wt. % or more, and is 0.2 wt. % or less.

In exemplary embodiments, the inorganic salt compound may include at least one selected from the group consisting of sodium chloride (NaCl), calcium chloride ($CaCl_2$), sodium sulfite ($Na_2SO_3$), sodium sulfate ($Na_2SO_4$), sodium carbonate ($Na_2CO_3$), potassium chloride (KCl), trisodium phosphate ($Na_3PO_4$) and ammonium chloride ($NH_4Cl$). Preferably, sodium chloride (NaCl) and sodium sulfite ($Na_2SO_3$) are used in terms of minimizing the influence on the article to be packaged by a packaging film made of the aqueous dispersion of the copolymer.

In exemplary embodiments, the inorganic salt compound may be added to the mixed solution in an aqueous solution state. For example, after dissolving the inorganic salt compound in water to prepare the aqueous solution of the inorganic salt compound, the aqueous solution of the inorganic salt compound may be added to the mixed solution to prepare an aqueous dispersion of the ethylene-carboxylic acid copolymer. In this case, an amount of the used inorganic salt compound may be adjusted based on the total weight of the aqueous dispersion of the ethylene-carboxylic acid copolymer.

In exemplary embodiments, the step of adding the inorganic salt compound may be performed at a temperature of 60 to 80° C. For example, the aqueous solution of the inorganic salt compound may be added to the mixed solution, followed by stirring the mixture at a temperature of 60 to 80° C. When adding the inorganic salt compound at a temperature of less than 60° C., it is difficult to uniformly stir the aqueous solution of the inorganic salt compound and the mixed solution due to an increase in the viscosity of the mixed solution according to a decrease in temperature, and thereby the effect of reducing the viscosity of the inorganic salt compound may be decreased. When adding the inorganic salt compound at a temperature above 80° C., an evaporation amount of water in the aqueous dispersion may be increased during putting the same, such that the concentration of the ethylene-(meth)acrylic acid copolymer may be excessively increased. Therefore, it may be difficult to adjust the viscosity of the aqueous dispersion to a desired range.

In exemplary embodiments, the aqueous dispersion of the ethylene-carboxylic acid copolymer with the inorganic salt compound added thereto may have a viscosity of 6,000 cPs or less. Therefore, the aqueous dispersion may be uniformly coated even under room temperature conditions. Preferably, the viscosity thereof is 5,000 cPs or less, or 3,000 cPs or less, and more preferably, 1,000 cPs or less.

In exemplary embodiments, the viscosity of the aqueous dispersion including the ethylene-(meth)acrylic acid copolymer and the inorganic salt may be 60% or less based on the viscosity of the mixed solution including the ethylene-(meth)acrylic acid copolymer. For example, the viscosity of the aqueous dispersion may be reduced to 60% or less by the addition of the inorganic salt compound. Therefore, even if the mixed solution has a high viscosity by including the ethylene-(meth)acrylic acid copolymer at a high concentration, the viscosity may be effectively adjusted by using the inorganic salt compound. Preferably, the viscosity of the aqueous dispersion is 20% or less, 15% or less, or 10% or less based on the viscosity of the mixed solution.

The aqueous dispersion of the ethylene-carboxylic acid copolymer includes an aqueous dispersion of the ethylene-(meth)acrylic acid copolymer, a basic compound, an inorganic salt compound, and water as the balance.

The ethylene-(meth)acrylic acid copolymer is included in an amount of 30 wt. % or more based on the total weight of the aqueous dispersion. Preferably, the ethylene-(meth)acrylic acid copolymer is included in an amount of 40 wt. % or more, more preferably, in an amount of 41 wt. % or 45 wt. % or more based on the total weight of the aqueous dispersion.

In exemplary embodiments, the basic compound may include at least one selected from the group consisting of ammonium hydroxide ($NH_4OH$), lithium hydroxide (LiOH), sodium hydroxide (NaOH), potassium hydroxide (KOH), cesium hydroxide (CsOH), and an organic amine compound.

The basic compound may perform an acid-base neutralization reaction with a carboxyl group of the (meth)acrylic acid-derived unit of the ethylene-(meth)acrylic acid copolymer. In this case, the dispersibility of the ethylene-(meth)acrylic acid copolymer in water may be increased and gelation may be prevented.

In exemplary embodiments, the basic compound may be included in an amount of 1 to 12 wt. % based on the total weight of the aqueous dispersion of the ethylene-carboxylic acid copolymer. When the content of the basic compound is less than 1 wt. %, the neutralization reaction for the carboxyl group of the (meth)acrylic acid-derived unit may be insufficiently performed. Accordingly, the dispersibility of the ethylene-(meth)acrylic acid copolymer in water may be reduced. When the content of the basic compound exceeds 12 wt. %, the ethylene-(meth)acrylic acid copolymer may be excessively neutralized to cause an increase in the viscosity of the aqueous dispersion. Preferably, the basic compound is included in an amount of 2 to 6 wt. % based on the total weight of the aqueous dispersion of the ethylene-carboxylic acid copolymer.

In the present disclosure, including the inorganic salt compound in the aqueous dispersion of the ethylene-carboxylic acid copolymer may encompass that the aqueous dispersion contains ions from which the inorganic salt compound is dissociated.

The inorganic salt compound may improve the dispersibility of the ethylene-(meth)acrylic acid copolymer in water. For example, the inorganic salt compound may be dissolved in water to increase the concentration of ions in the aqueous dispersion.

In exemplary embodiments, the inorganic salt compound may be included in an amount of 0.01 to 0.3 wt. % based on the total weight of the aqueous dispersion. When the content of the inorganic salt compound is less than 0.01 wt. %, the viscosity of the aqueous dispersion of the ethylene-(meth) acrylic acid copolymer may not be sufficiently reduced. When the content of the inorganic salt compound exceeds 0.3 wt. %, some of the components of the aqueous dispersion of the ethylene-carboxylic acid copolymer may be aggregated to form a precipitate in the dispersion.

In exemplary embodiments, the inorganic salt compound may include at least one selected from the group consisting of sodium chloride (NaCl), calcium chloride ($CaCl_2$), sodium sulfite ($Na_2SO_3$), sodium sulfate ($Na_2SO_4$), sodium carbonate ($Na_2CO_3$), potassium chloride (KCl), trisodium phosphate ($Na_3PO_4$) and ammonium chloride ($NH_4Cl$). Preferably, sodium chloride (NaCl) and sodium sulfite ($Na_2SO_3$) are used in terms of minimizing the influence on the article to be packaged by the packaging film made of the aqueous dispersion of the copolymer.

Water may be provided as a solvent and/or dispersing solvent of the ethylene-(meth)acrylic acid copolymer, the basic compound, and the inorganic salt compound. In some embodiments, the water may include pure water or deionized water. For example, the basic compound and the inorganic salt compound may be dissolved in water to substantially exist in an ionic state.

In exemplary embodiments, water may be included as the balance to the ethylene-carboxylic acid copolymer, the basic compound and the inorganic salt compound. In one embodiment, the aqueous dispersion may not include a component other than the ethylene-carboxylic acid copolymer, the basic compound, the inorganic salt compound and water as the balance.

The aqueous dispersion of the ethylene-carboxylic acid copolymer may have a viscosity of about 6,000 cPs or less when the concentration of the copolymer is about 41 wt. %. In addition, the aqueous dispersion may have a viscosity of about 1,000 cPs or less or about 500 cPs or less when the concentration of the copolymer is about 35 wt. %. The viscosity may be a viscosity measured at room temperature (25° C.)

FIG. 2 is a graph illustrating a viscosity of an aqueous dispersion according to exemplary embodiments of the present invention, according to a concentration of a copolymer and a concentration of a basic compound.

Referring to FIG. 2, the viscosity of the aqueous dispersion may vary depending on the concentration of the copolymer and the concentration of the basic compound in the aqueous dispersion.

For example, when the concentration of the basic compound is constant, the viscosity of the aqueous dispersion may change as the concentration of the copolymer in the aqueous dispersion increases. In this case, as the concentration of the copolymer increases, the viscosity of the aqueous dispersion may increase.

For example, when the concentration of the copolymer in the aqueous dispersion is constant, the viscosity of the aqueous dispersion may increase as the concentration of the basic compound increases.

In exemplary embodiments, when the content of the ethylene-(meth)acrylic acid copolymer is 35 wt. % or more, the aqueous dispersion may satisfy the following Relational Equation 1.

$$V < 33{,}193 \ln(Ce) - 115{,}014 \qquad \text{[Relational Equation 1]}$$

In Relational Equation 1, V may be a viscosity (cP) of the aqueous dispersion, and Ce may be a content (wt. %) of the copolymer.

An aqueous dispersion that satisfies the above Relational Equation 1 may have a low viscosity even when including the copolymer at a high concentration. In this case, it is possible to further increase the concentration of the aqueous dispersion while maintaining the coating properties.

In some embodiments, the aqueous dispersion may not include an organic solvent. Therefore, by applying the aqueous dispersion, and then evaporating moisture, it is possible to easily form a coating layer.

The aqueous dispersion of the ethylene-carboxylic acid copolymer according to exemplary embodiments may be used as a coating agent or a bonding agent. For example, the aqueous dispersion may coat a surface of a metal thin film.

FIG. 3 is a schematic cross-sectional view illustrating a coating film and a multilayer film including the same according to exemplary embodiments of the present invention.

In exemplary embodiments, the aqueous dispersion may be applied on a substrate and then dried to form a coating film 10.

Another layer may be laminated on at least one surface of the coating film 10 to form a multilayer film 100. For example, an upper layer 20 may be laminated on an upper portion of the coating film 10, and a lower layer 30 may be laminated on a lower portion thereof to form the multilayer film 100. The above other layer may include a polymer film layer and a metal thin film layer.

For example, a polyolefin layer may be adhered to one surface of the coating film 10 and an aluminum layer may be adhered to the other surface thereof to form the multilayer film 100.

The multilayer film 100 may be provided as a packaging material for food, for example.

Hereinafter, experimental examples including specific examples and comparative examples are proposed to more concretely understand the present invention. However, it will be apparent to those skilled in the art that such examples are provided for illustrative purposes, and various modifications and alterations may be possible without departing from the scope and spirit of the present invention, and such modifications and alterations are duly included in the present invention as defined by the appended claims.

EXAMPLE 1

About 35 wt. % of ethylene-carboxylic acid copolymer (weight ratio of ethylene:acrylic acid=80:20, and weight average molecular weight (Mw)=30,000), about 3 wt. % of NH$_4$OH and distilled water as the balance were mixed at about 90° C. for 1 hour to form a mixed solution.

NaCl was dissolved in 3 mL of water to prepare an aqueous NaCl solution.

The prepared aqueous NaCl solution was added to the mixed solution and stirred at about 70° C. to prepare an aqueous dispersion of an ethylene-carboxylic acid copolymer of Example 1.

At this time, the content of NaCl was adjusted to 0.1 wt. % based on the total weight of the aqueous dispersion of the ethylene-carboxylic acid copolymer.

EXAMPLE 2

An aqueous dispersion was prepared according to the same procedure as described in Example 1, except that 41 wt. % of an ethylene-carboxylic acid copolymer was mixed when forming the mixed solution.

EXPERIMENTAL EXAMPLE 1

Viscosities of the aqueous dispersions of Examples 1 and 2 and the mixed solutions (the mixed solution of Example 1 and the mixed solution of Example 2) without the addition of the aqueous NaCl solution in Examples 1 and 2 were measured, and the graph shown in FIG. 4 was obtained using results thereof.

The viscosities were measured using a Brookfield viscometer at room temperature (25° C.), and a plate spindle was used.

Referring to FIG. 4, the viscosities of the dispersions of the examples with the addition of the inorganic salt compound were significantly reduced, compared to the dispersion without the addition of the inorganic salt compound (NaCl) (0 wt. %). Herein, the measured viscosities of the aqueous dispersion having a concentration of 35 wt. % were about 6,848 cPs and about 463 cPs before and after the addition of the inorganic salt compound, respectively. The measured viscosities of the aqueous dispersion having a concentration of 41 wt. % were about 10,500 cPs and about 5,715 cPs before and after the addition of the inorganic salt compound, respectively.

A change trend of the viscosities was calculated based on the viscosities at concentrations of 35 wt. % and 41 wt. % of the aqueous dispersion without the addition of the inorganic salt compound and the aqueous dispersion with the addition of the inorganic salt compound, and results thereof are shown in the graph of FIG. 5.

Referring to FIG. 5, it was confirmed that the viscosity (V) of the aqueous dispersion with the addition of the inorganic salt compound may satisfy the following Relational Equation 1 when the content (Ce) of the ethylene-(meth)acrylic acid copolymer was 35 wt. % or more.

$$V < 33{,}193 \ln(Ce) - 115{,}014 \qquad \text{[Relational Equation 1]}$$

EXAMPLE 3

About 35 wt. % of ethylene-carboxylic acid copolymer (weight ratio of ethylene:acrylic acid=80:20, and weight average molecular weight (Mw)=30,000), about 3 wt. % of NH$_4$OH, and distilled water as the balance were mixed at about 90° C. for 1 hour to form a mixed solution.

NaCl, CaCl$_2$ and Na$_2$SO$_3$ aqueous solutions were prepared, in which NaCl, CaCl$_2$ and Na$_2$SO$_3$ were dissolved in 3 mL of water, respectively.

The NaCl, CaCl$_2$ and Na$_2$SO$_3$ aqueous solutions were added to the mixed solution, respectively, to prepare an aqueous dispersion of an ethylene-carboxylic acid copolymer. At this time, the concentrations of NaCl, CaCl$_2$ and Na$_2$SO$_3$ in the aqueous dispersion were adjusted to 0.04 and 0.07 wt. %, respectively.

EXPERIMENTAL EXAMPLE 2

Viscosities of the aqueous dispersions of Example 3 were measured, and results thereof are shown in FIG. 6.

Referring to FIG. 6, it was confirmed that the viscosities of the aqueous dispersions could be effectively reduced by adjusting the type and concentration of the inorganic salt compound.

What is claimed is:
1. A method of preparing an aqueous dispersion of an ethylene-carboxylic acid copolymer, comprising:
   mixing 30% by weight or more of an ethylene-(meth)acrylic acid copolymer, a basic compound, and water to form a mixed solution; and adding, as an inorganic salt compound, 0.01 to 0.04% by weight of calcium chloride (CaCl$_2$) or 0.07 to 0.3% by weight of sodium sulfite (Na$_2$SO$_3$) to the mixed solution.

2. The method of preparing an aqueous dispersion of an ethylene-carboxylic acid copolymer according to claim 1, wherein the step of forming the mixed solution comprises stirring the mixture at a temperature of 80° C. or higher.

3. The method of preparing an aqueous dispersion of an ethylene-carboxylic acid copolymer according to claim 1, wherein the step of adding the inorganic salt compound comprises adding an aqueous solution of the inorganic salt compound.

4. The method of preparing an aqueous dispersion of an ethylene-carboxylic acid copolymer according to claim 1, wherein the step of adding the inorganic salt compound comprises stirring the mixture at a temperature of 60 to 80° C.

5. The method of preparing an aqueous dispersion of an ethylene-carboxylic acid copolymer according to claim 1, wherein the ethylene-(meth)acrylic acid copolymer comprises 70 to 85% by weight of ethylene-derived unit and 15 to 30% by weight of (meth)acrylic acid-derived unit.

6. The method of preparing an aqueous dispersion of an ethylene-carboxylic acid copolymer according to claim 1, wherein the ethylene-(meth)acrylic acid copolymer has a weight average molecular weight (Mw) of 10,000 to 60,000.

7. The method of preparing an aqueous dispersion of an ethylene-carboxylic acid copolymer according to claim 1, wherein the basic compound is mixed in an amount of 1 to 12% by weight based on the total weight of the mixed solution.

8. The method of preparing an aqueous dispersion of an ethylene-carboxylic acid copolymer according to claim 1, wherein a viscosity of the mixed solution before adding the inorganic salt compound is 6,000 cPs or more, and the viscosity of the aqueous dispersion solution with the inorganic salt compound added thereto is 5,000 cPs or less.

9. The method of preparing an aqueous dispersion of an ethylene-carboxylic acid copolymer according to claim 1, wherein the aqueous dispersion including the ethylene-(meth)acrylic acid copolymer and the inorganic salt has a viscosity of 60% or less based on the viscosity of the mixed solution including the ethylene-(meth)acrylic acid copolymer.

10. An aqueous dispersion of an ethylene-carboxylic acid copolymer comprising:
    30% by weight or more of an ethylene-(meth)acrylic acid copolymer,
    a basic compound,
    0.01 to 0.04% by weight of calcium chloride (CaCl$_2$) or 0.07 to 0.3% by weight of sodium sulfite (Na$_2$SO$_3$), and
    water as the balance.

11. The aqueous dispersion of the ethylene-carboxylic acid copolymer according to claim 10, wherein the ethylene-(meth)acrylic acid copolymer comprises 70 to 85% by weight of ethylene-derived unit and 15 to 30% by weight of (meth)acrylic acid-derived unit.

12. The aqueous dispersion of the ethylene-carboxylic acid copolymer according to claim 10, wherein the basic compound is included in an amount of 1 to 12% by weight based on the total weight of the aqueous dispersion.

* * * * *